May 26, 1942. B. A. WADE 2,284,183
MECHANICALLY ANIMATED ARTIFICIAL BAIT
Filed April 2, 1941

Inventor
Barry A. Wade
By John Attleu D*****
Attorney

Patented May 26, 1942

2,284,183

UNITED STATES PATENT OFFICE 2,284,183

MECHANICALLY ANIMATED ARTIFICIAL BAIT

Barry A. Wade, Evansville, Ind.

Application April 2, 1941, Serial No. 386,556

2 Claims. (Cl. 43—43)

This invention relates to new and useful improvements in mechanically animated artificial bait.

The invention comprehends the animation of all artificial baits used in fly casting or bait casting fishing, including frogs, toads, small fish, minnows, turtles, lizards, craw-fish, crawlers, bugs, mice, animals, birds, insects and flies.

The invention further comprehends the use of any mechanical or electrical device to obtain the desired animation of the artificial bait, such as clock mechanism, springs, weights, rubber-bands, batteries, electric-motors, vibrators, or radio-controlled electric power devices.

The artificial bait is to be made out of any non-breakable rustless material, including various plastic materials.

The bait is to be manufactured so that it will float or sink and said action will be adjustable by weights to be placed in rubber flippers, feet, appendages, or in the shell itself.

With the foregoing and other objects in view that will appear as the nature of my invention is better understood, the same consists in the novel features of construction, combination and arrangement of parts illustrated in the accompanying drawing and more particularly pointed out in the appended claims.

In the accompanying drawing, which is for illustrative purposes only and is therefore not drawn to scale:

Referring to the drawing for a more particular description of my invention, and in which drawing like parts are designated by like reference characters throughout the several views, A designates the artificial bait and B the watch mechanism, as a whole.

Figure 1:
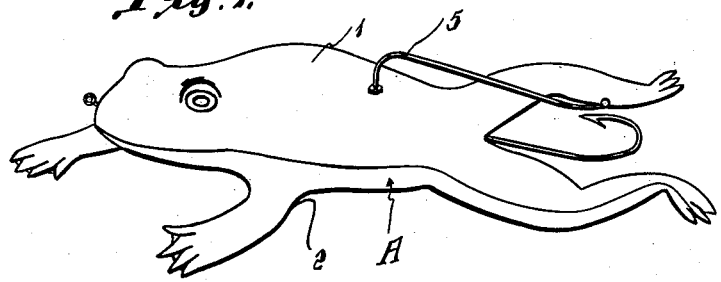
Figure 1 is a perspective view, illustrating the application of my invention in association with artificial frog bait.
Figure 2:
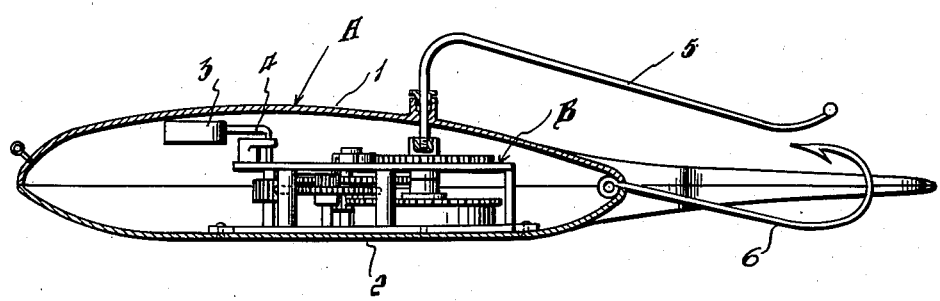
Figure 2 is a central longitudinal section.
Figure 3:
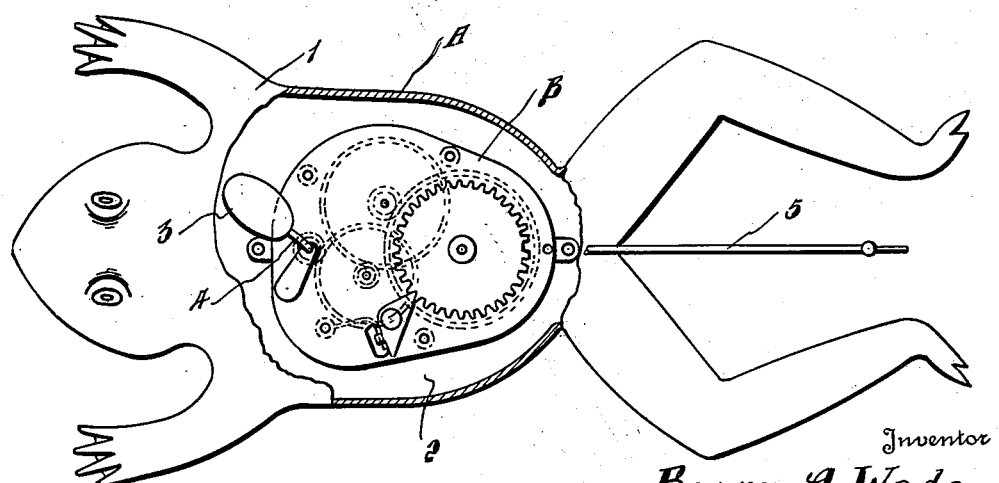
Figure 3 is a plan view, with the top section of the shell partly broken away to illustrate the watch mechanism and associated parts.

To illustrate one application of my invention, the bait shown in the present instance is an artificial frog, whose shell is approximately one-sixteenth of an inch thick, and composed of the top and bottom halves or sections 1 and 2, respectively, separated horizontally. If desired, green tenile may be used for the top half or section 1 of the shell and yellow tenile for the bottom section, and the two sections sealed with acetone.

The mechanical or animating device illustrated in the present instance, is an ordinary watch mechanism B with the fragile parts (hairspring and balance shaft) removed and showing an eccentric or off-balance weight 3 attached by means of the wire 4 to the main driving mechanism.

The numeral 5 represents the anti-weed guard, for the hook 6, and which also acts as the winding stem. The hook 6 extends horizontally from the rear end of the shell between the rear legs of the frog, while the rear end of the anti-weed guard, which is preferably in the form of a wire rod, extends horizontally above and over the barb of the hook.

In practice, the watch mechanism is riveted or otherwise fastened to the bottom half or section 2 of the bait shell, and the desired animation, vibration or life-like action of the bait is produced by the eccentric or off-balance rotary movement of the weight 3.

From the foregoing description taken in connection with the drawing, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claims.

Having described my invention, what I claim as new and desire to secure by Letters Patent, is:

1. Artificial bait in the form of fish, small animals, birds or insects, comprising a shell composed of top and bottom horizontally separated sections, a watch mechanism rigidly secured to the bottom section of the shell, and an eccentric or off-balance weight attached to the main drive of the watch mechanism and adapted to produce the animated life-like action of the artificial bait, substantially as and for the purpose specified.

2. Artificial bait in the form of fish, small animals, birds or insects, comprising a shell composed of top and bottom horizontally separated sections, a watch mechanism rigidly secured to the bottom section of the shell, a hook extending from the rear end of the shell and a weed guard in the form of a wire rod, extending over the barb of the hook, said weed guard formed with a right-angularly bent front end portion which is adapted to serve as a winding stem for the watch mechanism.

BARRY A. WADE.